UNITED STATES PATENT OFFICE.

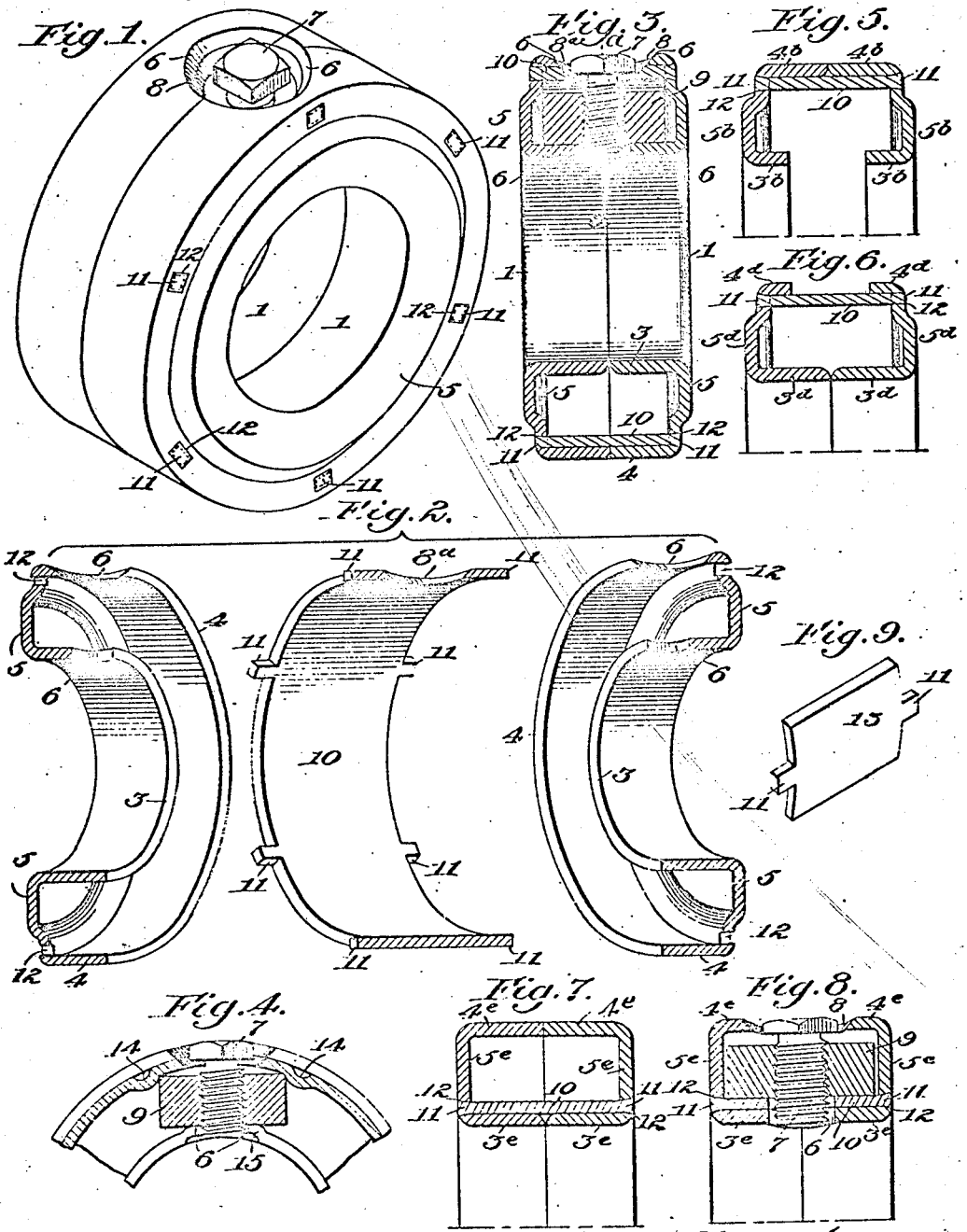

HOWARD T. HALLOWELL, OF PHILADELPHIA, PENNSYLVANIA, ASSIGNOR TO STANDARD PRESSED STEEL COMPANY, OF PHILADELPHIA, PENNSYLVANIA, A CORPORATION OF PENNSYLVANIA.

SHAFT-COLLAR.

No. 895,409.     Specification of Letters Patent.     Patented Aug. 4, 1908.

Application filed March 20, 1908. Serial No. 422,318.

*To all whom it may concern:*

Be it known that I, HOWARD T. HALLOWELL, a citizen of the United States, residing in Philadelphia, Pennsylvania, have invented certain Improvements in Shaft-Collars, of which the following is a specification.

My invention relates to the construction of an annulus, such as a shaft collar, and the object of my invention is to form a shaft collar of a plurality of sheet metal members pressed into the desired shape and so constructed as to maintain in proper position a suitable nut or other support through which a set screw is passed for normally retaining such annulus or collar in place upon a shaft or other similar element.

My invention refers particularly to improvements in a riveted structure, in which an inner wall or sleeve for engagement with the shaft is provided.

Other features of my invention will be pointed out hereinafter, reference being had to the accompanying drawings, in which:

Figure 1, is a perspective view of a complete shaft collar made in accordance with my invention; Fig. 2, is a perspective view showing in section the several members comprising the collar shown in Fig. 1; Fig. 3, is a sectional view of the collar shown in Fig. 1; Fig. 4, is a sectional view on the line a—a, Fig. 3; Figs. 5 to 9, both inclusive, are views illustrating modified forms of collars within the scope of my invention.

My present invention comprises certain improvements in the form of shaft collars shown in Patent No. 846,088, dated March 5, 1907.

All of the structures forming the subject of my invention comprise sections or blanks of sheet metal pressed into shape to form a hollow member with a shaft engaging sleeve; so disposed as to provide mutual connection and support, and having portions of the metal comprising the same displaced so as to confine in proper relative position a suitable nut for the set screw employed with such collars.

In the structure shown in Figs. 1, 2, 3 and 4, the collar comprises annular members 1, 1, of similar size and contour; being substantially U-shape in cross-section, and having peripheral walls 3 and 4, and side walls 5 integral therewith; which members have been previously formed from sheet metal blanks by means usually employed for such purpose. These sections are provided with half round registering notches 6 in their inner and outer peripheral walls 3 and 4, providing for the passage of a set screw 7; the outer notches being counterbored at 8, and said set screw is arranged to engage a nut or other threaded support 9 which is mounted within the hollow space formed by the sections; being confined by suitable means in proper position relative to the registering notches of the sections forming the collar.

To maintain the sections 1, 1, of the form of collar shown in Figs. 1, 2, 3 and 4, in the proper position with relation to each other, I provide an annular securing sleeve 10 disposed against the inner side of the outer peripheral wall of said sections, such sleeve being apertured and counterbored at $8^a$ for the passage of the set screw 7, and in order to confine the sections 1, 1, in position by said sleeve, the latter is provided with spuds 11, adapted to pass through apertures 12 in the side walls 5 of the sections 1 and be riveted thereto in the manner clearly shown in the drawings, such action binding the sections together and holding them against displacement. If desired, the sleeve 10 may be brazed, electrically welded or otherwise permanently secured to the sections 1, 1. In the present instances, the sections 1, 1, have their sharp corners rounded or beveled. This securing sleeve 10 is preferably formed into the necessary shape from a flat strip; the meeting edges of which may or may not be secured by brazing or other desirable means.

Instead of employing the annular band shown in Fig. 2, and in the sectional views, Figs. 2 and 4, I may use small plates 13 as illustrated in Fig. 9, for the purpose of securing the sections of the collar together, or rivets of the ordinary type may be employed. Instead of employing the annular band within the structure, as illustrated in Figs. 3 and 4, it may embrace the inner peripheral wall. Instead of spuds passing entirely through the side walls and riveted on the outside of the same, they may only touch said side walls, and the edges of the inner band may be electrically welded by means of slight raised contact points or projections similar to spuds but of smaller proportions.

The nut or support, through which the set screw passes, is laid adjacent the sections forming the collar during the process of finally securing the same together, and to retain this nut in place I may provide various means, such for instance as displacing the metal of the outer webs of the sections forming the shell by suitable means, as clearly shown at 14 in Fig. 4, of the drawings.

The displacing of the metal in one of the peripheral walls of the structure serves to locate the nut in line with the apertures in said peripheral wall or walls, but cannot serve to firmly fix said nut in place, inasmuch as there must be sufficient room to permit free insertion of said nut. It is desirable, of course, to prevent any rattling of the nut in the finished collar, and to accomplish this the finished collar is placed in a die and a depression 15 formed in the inner peripheral wall adjacent the aperture for the passage of the set screw, as indicated in the drawings. By this means a seat is formed for the nut, and the latter is held firmly between the same and the displaced portions of the peripheral wall as indicated.

Figs. 5 to 9, both inclusive, illustrate other forms of collars embodying my invention; each of the forms shown in said figures having a pair of members of similar shape with a supplemental annular securing band to which they are riveted.

In Fig. 5 a pair of members substantially U-shape in cross section are shown, having peripheral walls $3^b$ and $4^b$ and side walls $5^b$; the peripheral walls $3^b$ being disposed some distance apart.

In Fig. 6, I have shown a structure comprising members having the same contour, each provided with peripheral walls $3^d$ and $4^d$, the former serving as shaft conforming portions which abut at the middle; side walls $5^d$ joining said peripheral walls. The outer peripheral walls are of substantially the same character as those shown in Fig. 5. In these several forms of shaft collar, the members are secured together by the connecting band 10 having spuds 11 which are riveted through apertures 12 in the side walls.

Fig. 7 shows a structure in which a pair of U-shaped members having peripheral walls $3^e$ and $4^e$ and side walls $5^e$, are arranged to abut each other and form a hollow space. They are secured together by the connecting band 10, which in this instance lies adjacent the shaft conforming portions or peripheral walls $3^e$ of the members and is secured thereto in the same manner as indicated with reference to the other figures. Fig. 8 is another sectional view of the structure shown in Fig. 7, indicating the manner of applying a nut and set screw thereto.

In completing the annulus or shaft collar, the members of the same are assembled in a suitable manner; the nut being properly positioned and maintained in such position by means of the set screw, or a suitable pin, which is passed through the apertures of the several members and then the members are riveted together, the nut having been positioned by displacing the metal of the annular band or the peripheral wall of one of the members relatively thereto, in the manner described.

I may, if desired, in addition to the riveting, braze or electrically weld any and all of the abutting faces of the several forms of structures shown herein, and I may further harden the side wall or face of the respective collars which comes opposite the work. In all instances the strip used as the inner securing collar or sleeve may be made of flat metal with its abutting ends brazed or not as desired, and while the outer securing sleeves may also be made of such metal, the abutting edges of the same are preferably brazed.

In some forms of the structure shown herein, it may be desirable to provide oblong nuts with spacing members, such for instance as shown in my companion case filed herewith.

The apertures in the collar receiving the set screws are preferably countersunk or bored to accommodate the heads of the set screws so that the latter will not project radially beyond the peripheral face of the same.

I claim:

1. The combination, in a shaft collar, of a pair of members having integral inner and outer peripheral walls joined by side walls, an annular plate disposed within said members, spuds carried by said plate, the side walls of said members being apertured for the reception of said spuds whereby the said plate is riveted to the members and holds the same together, and a nut carried by said sections.

2. The combination, in a shaft collar, of a pair of members U-shaped in cross section having integral inner and outer peripheral walls joined by a side wall, securing means disposed within said members, spuds carried by said securing means, the members being apertured for the reception of said spuds whereby the said securing means is riveted to the sections and holds the same together, a nut carried by said sections, and a set screw for said nut.

3. The combination, in a shaft collar, of a pair of members of similar cross section, said members having integral inner and outer peripheral walls joined by side walls, said side walls being apertured, and means confined by said members and having portions positioned in said apertures and riveted to the side walls whereby said members of the collar are held together.

4. The combination, in a shaft collar, of a pair of members of similar cross section, each of said members having integral inner and outer peripheral walls joined by a side wall, said side wall being apertured, means confined by said members and having portions positioned in said apertures and riveted to the side walls whereby said members of the collar are held together, a nut disposed between said members, means for securing said nut to the collar, and a set screw entering said nut, the outer peripheral wall of the collar being countersunk for the reception of the head of said set screw.

5. A hollow sheet metal annulus or collar for shafts, comprising a pair of members having peripheral walls and side walls, an annular plate disposed within said members and lying against the outer peripheral wall of the same, the side walls of said members being apertured, and spuds carried by said plate and positioned in said apertures and riveted against the outer surface of said side walls, a nut disposed in the hollow space formed by said members, means integral with a member of the collar for holding said nut in place, and a set screw for said nut.

6. The combination, in a shaft collar, of a pair of pressed steel members of similar contour with portions disposed at right angles to each other, a connecting band disposed between said members to which they are secured, a nut confined in the annular space formed by said members, a set screw for said nut, the outer wall of said collar being constructed for the reception of the head of said set screw, and means integral with the members of the collar for holding said nut in place.

7. The combination, in a shaft collar, of a pair of members U-shaped in cross-section having integral inner and outer peripheral walls joined by a side wall, securing means disposed within said members, spuds carried by said securing means, the members being apertured for the reception of said spuds whereby the said securing means is riveted to the sections and holds the same together, a nut carried by said sections, a set screw for said nut, and means integral with the members of the collar for holding said nut in place.

8. The combination, in a shaft collar, of a pair of members of similar cross section, said members having integral inner and outer peripheral walls joined by side walls, said side walls being apertured, means confined by said members and having portions positioned in said apertures and riveted to the side walls whereby said members of the collar are held together, a nut disposed in the hollow space formed by said members, means integral with the members of the collar for holding said nut in place, and a set screw for said nut.

9. The combination, in a shaft collar, of a pair of members of similar cross-section, each of said members having integral inner and outer peripheral walls joined by a side wall, said side wall being apertured, means confined by said members and having portions positioned in said apertures and riveted to the side walls whereby said members of the collar are held together, a nut disposed between said members, means integral with said members for securing said nut to the collar, and a set screw entering said nut, the outer peripheral wall of the collar being countersunk for the reception of the head of said set screw.

In testimony whereof, I have signed my name to this specification, in the presence of two subscribing witnesses.

HOWARD T. HALLOWELL.

Witnesses:
  MURRAY C. BOYER,
  WM. A. BARR.